Figure 4:
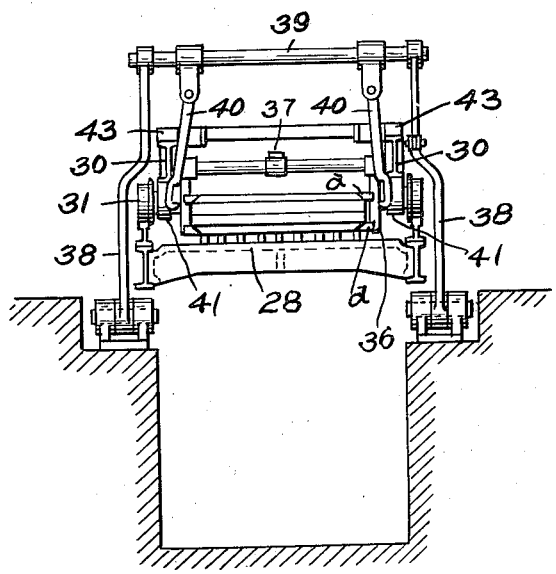

A. P. DIESCHER.
MANUFACTURE OF RUBBER TIRES, ETC.
APPLICATION FILED MAY 14, 1920. RENEWED JAN. 17, 1922.
1,407,193.
Patented Feb. 21, 1922.
8 SHEETS—SHEET 1.
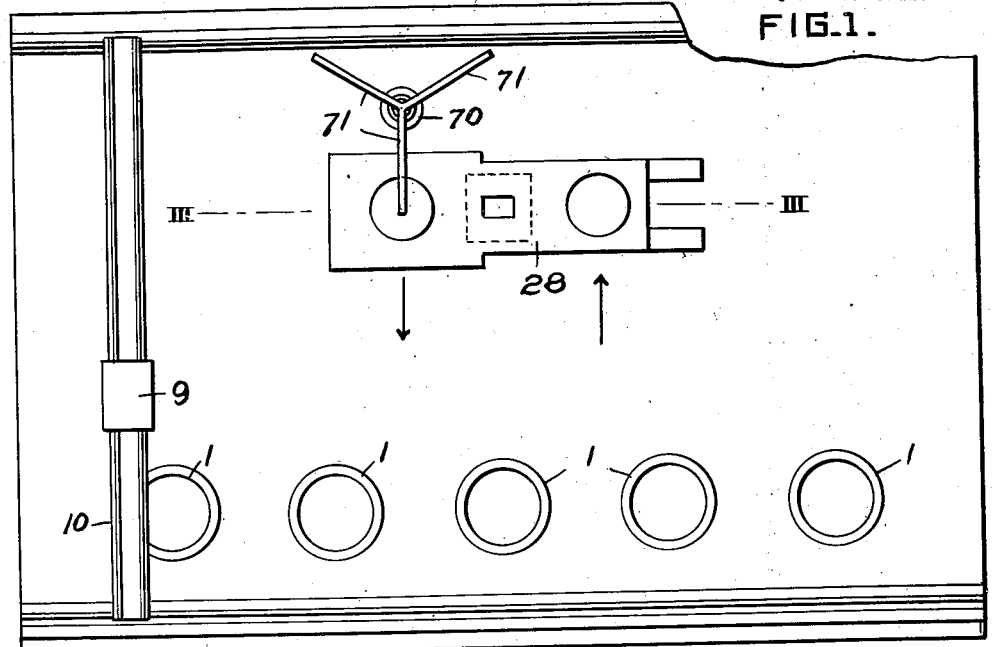
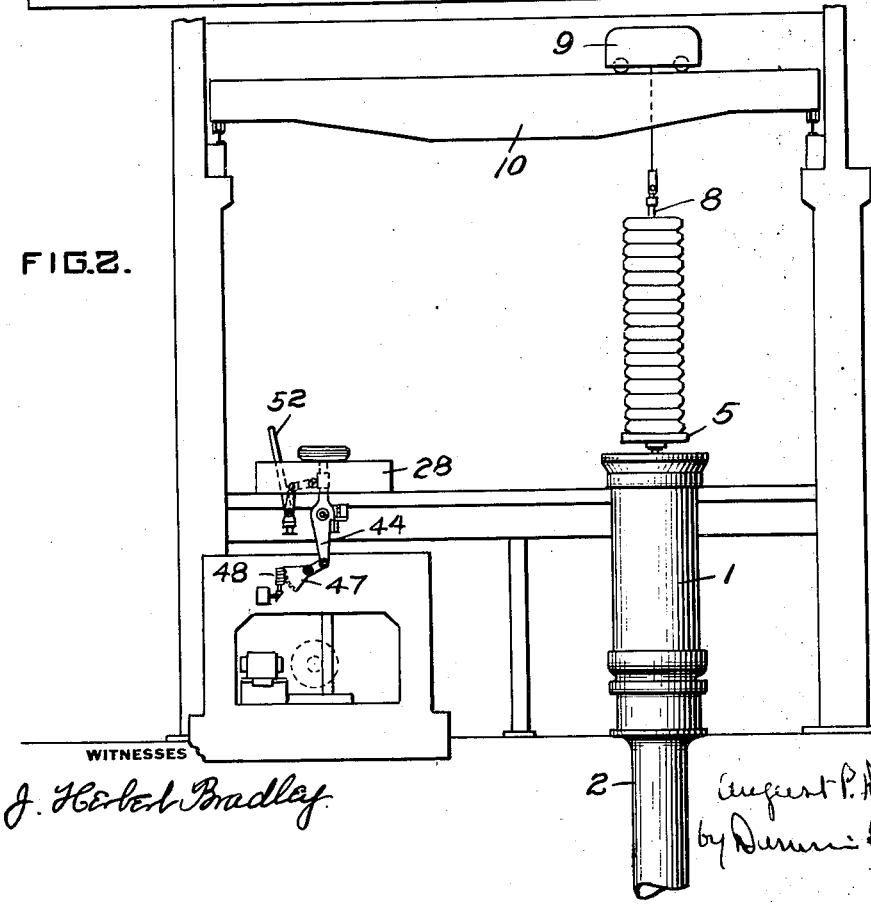

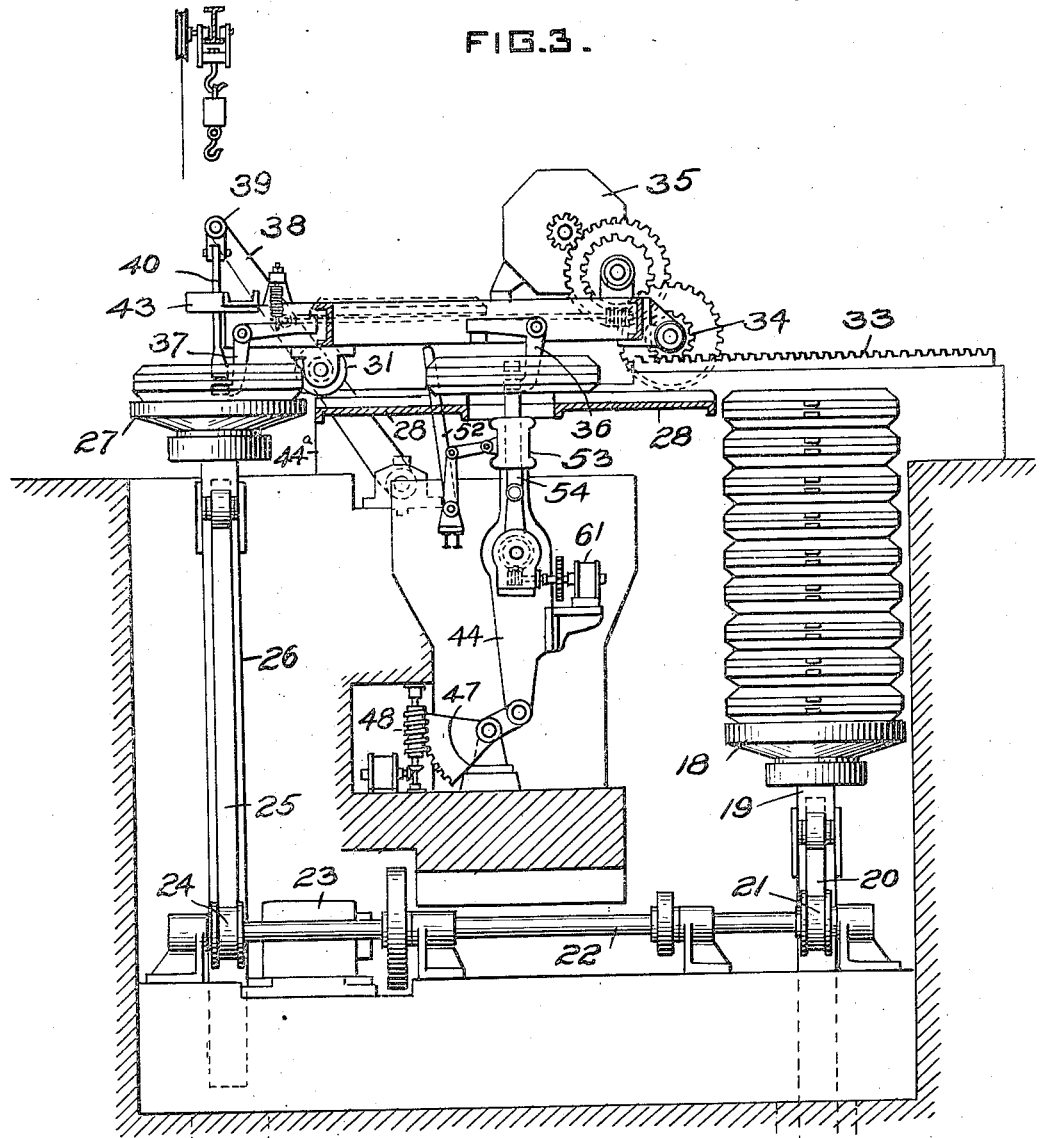

A. P. DIESCHER.
MANUFACTURE OF RUBBER TIRES, ETC.
APPLICATION FILED MAY 14, 1920. RENEWED JAN. 17, 1922.

1,407,193.

Patented Feb. 21, 1922.
8 SHEETS—SHEET 3.

WITNESSES

INVENTOR

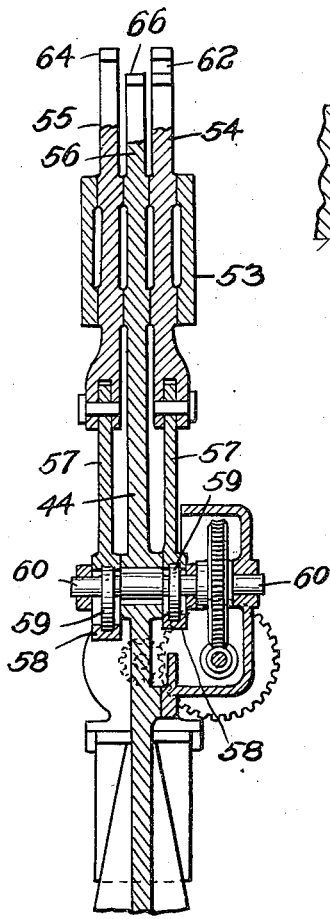
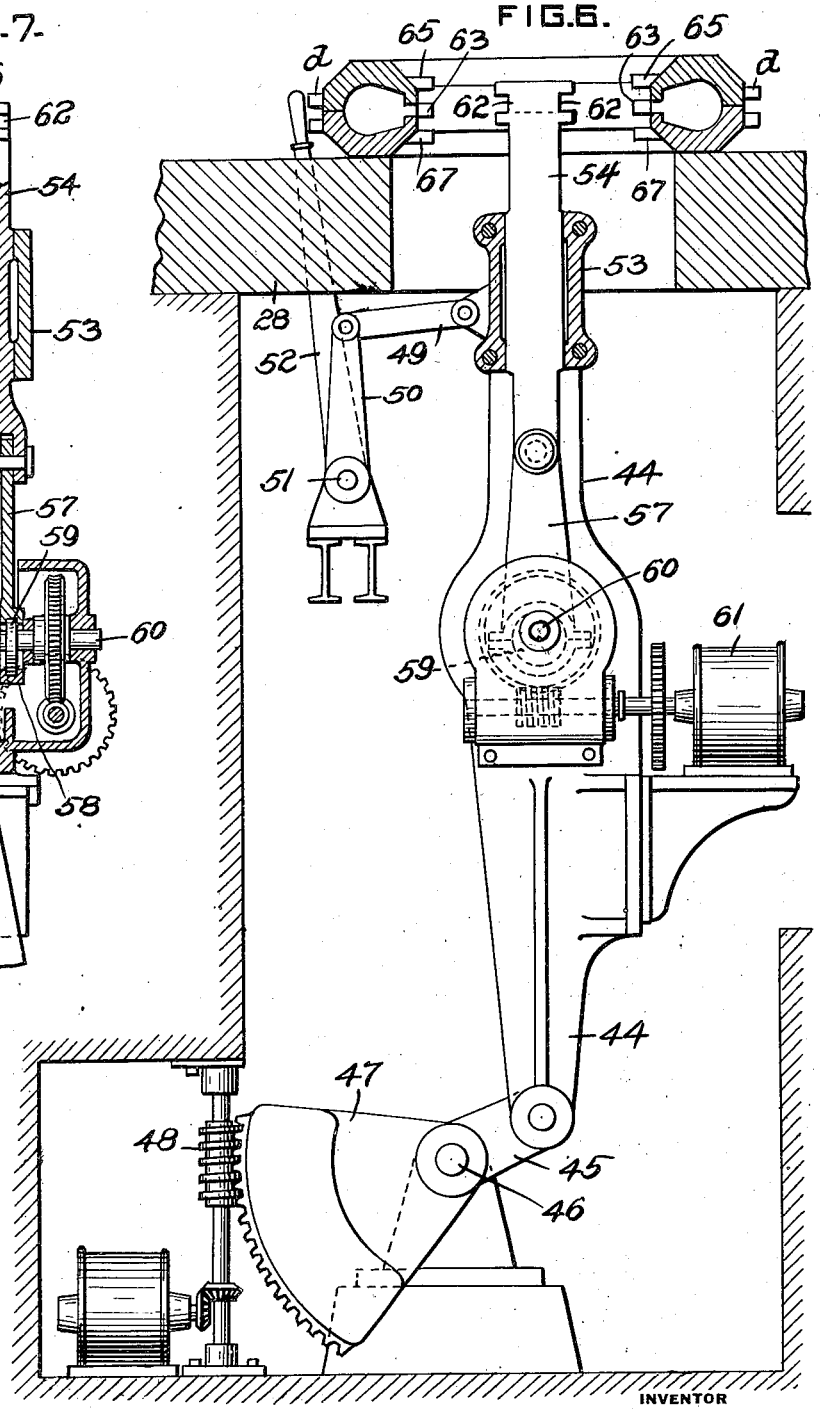

A. P. DIESCHER.
MANUFACTURE OF RUBBER TIRES, ETC.
APPLICATION FILED MAY 14, 1920. RENEWED JAN. 17, 1922.

1,407,193.

Patented Feb. 21, 1922.
8 SHEETS—SHEET 5.

WITNESSES

INVENTOR

A. P. DIESCHER.
MANUFACTURE OF RUBBER TIRES, ETC.
APPLICATION FILED MAY 14, 1920. RENEWED JAN. 17, 1922.

1,407,193.

Patented Feb. 21, 1922.
8 SHEETS—SHEET 6.

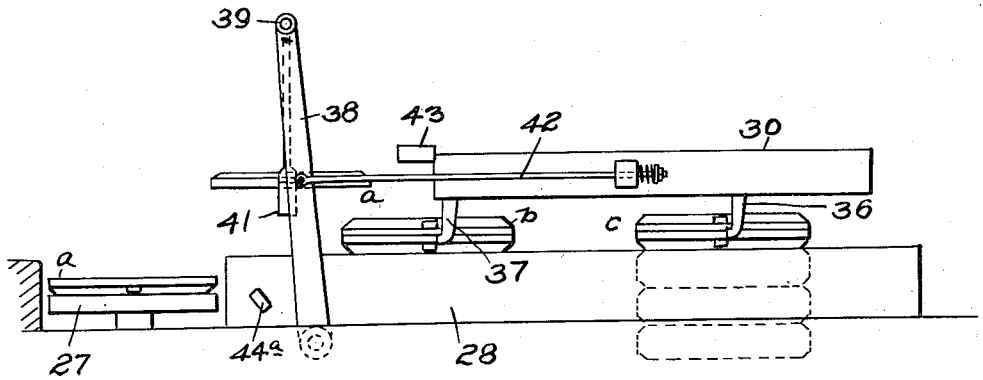
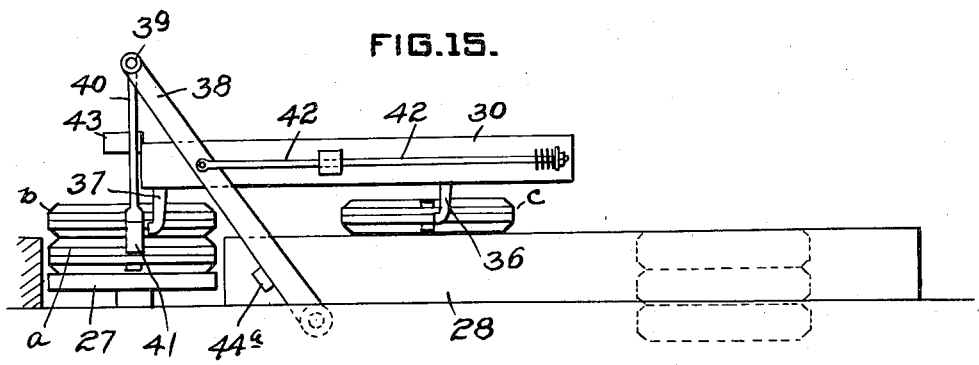
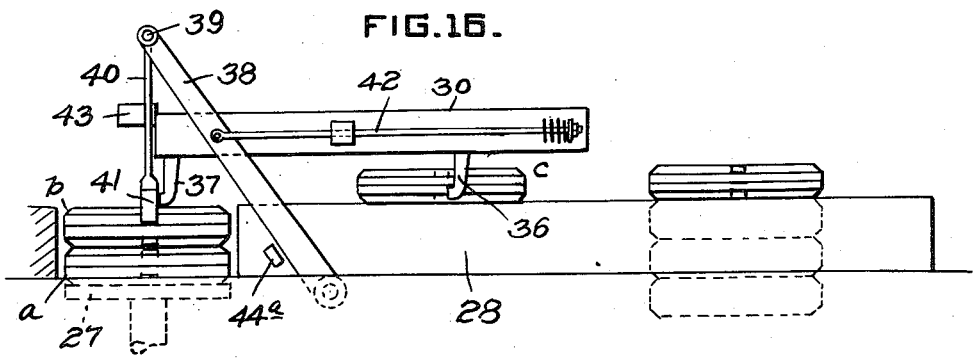

A. P. DIESCHER.
MANUFACTURE OF RUBBER TIRES, ETC.
APPLICATION FILED MAY 14, 1920. RENEWED JAN. 17, 1922.

1,407,193.

Patented Feb. 21, 1922.
8 SHEETS—SHEET 8.

WITNESSES

INVENTOR

UNITED STATES PATENT OFFICE.

AUGUST P. DIESCHER, OF PITTSBURGH, PENNSYLVANIA.

MANUFACTURE OF RUBBER TIRES, ETC.

1,407,193. Specification of Letters Patent. Patented Feb. 21, 1922.

Application filed May 14, 1920, Serial No. 381,329. Renewed January 17, 1922. Serial No. 530,000.

*To all whom it may concern:*

Be it known that I, AUGUST P. DIESCHER, residing at Pittsburgh, in the county of Allegheny and State of Pennsylvania, a citizen of the United States, have invented or discovered certain new and useful Improvements in the Manufacture of Rubber Tires, Etc., of which improvements the following is a specification.

It is to a large extent the present practice in manufacturing pneumatic tires for automobiles, etc., to build up the green rubber or rubber and fabric on cores, placing the cores with the built up tires in sectional molds which are then stacked up, one by one, in a vertical tank or shell and finally subjected to heat and pressure for a sufficient length of time to effect vulcanization. After vulcanization has been effected, the shells or chambers are opened, the molds removed one by one by suitable cranes or other means and distributed along a line of rails where they will be accessible for opening the molds and removing the cores with the vulcanized tires thereon. After the contents of a chamber has been thus removed, the mold sections are loosened from the tire, which operation is often difficult and laborious, the upper section of the molds removed, placed to one side and the vulcanized tires with the enclosed cores removed from the lower mold sections. These lower mold sections are then cleaned and dusted, cores with built up tires thereon placed in position in such lower sections, the top sections placed upon these lower sections and the charged molds stacked one by one into the chamber, and the above cycle repeated.

As will be readily understood, the filling of the molds, charging them into their treating chambers, removing them, opening the molds and removing the treated articles, involves much hard labor and time.

The object of the invention described herein is to provide for the removal of the entire charge of molds from a heating chamber, placing them in a position where they can be moved one by one to an opening machine, the mold sections loosened from the tires, shifted to a position where the cores and completed articles may be removed, a new article placed in position, the cover replaced and the recharged molds arranged in a stack or pile which is then placed in the heating chamber. The operations of removing the cover, charging a new tire, replacing the cover, being so effected that by the time all the molds which have been removed from the heating chamber have been opened, the tires removed and new tires charged and the cover replaced a stack of molds is formed which can then be placed in the heating chamber from which the molds were removed. The invention is hereinafter more fully described and claimed.

Figure 5:
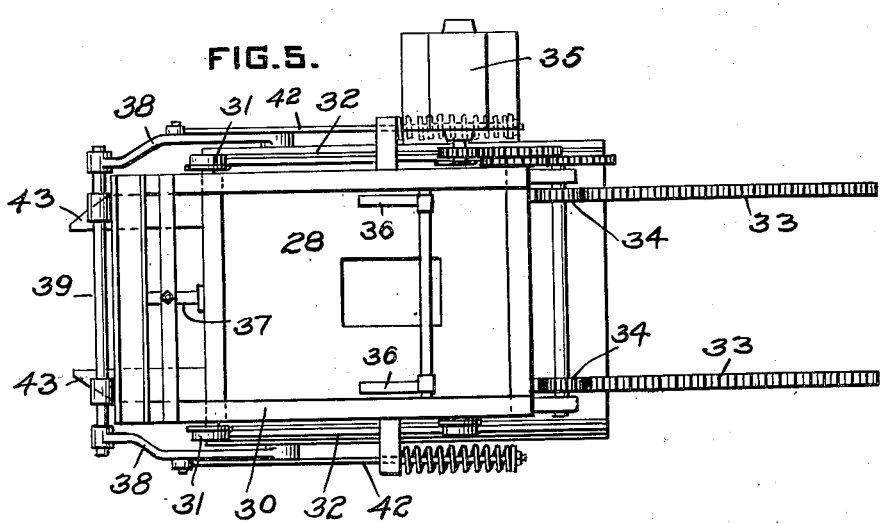
Figure 8:
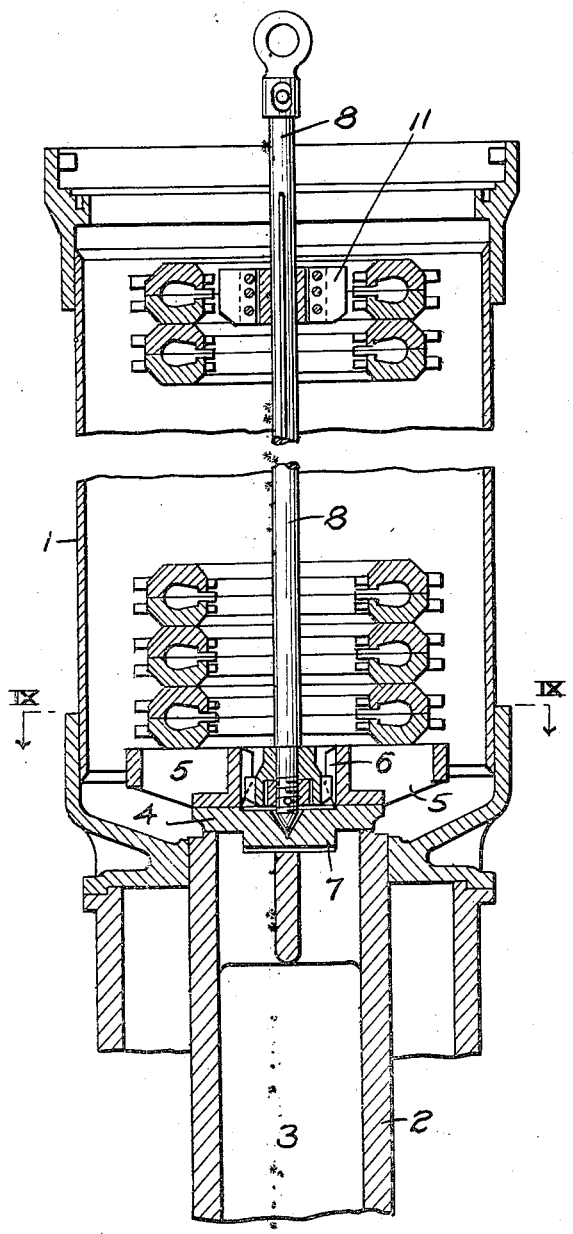
Figure 9:
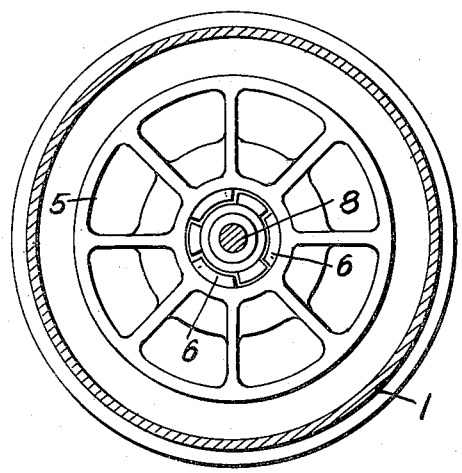
Figure 10:
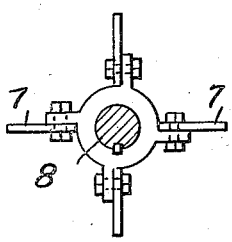
Figure 11:
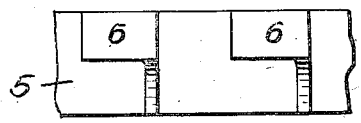
Figure 12:
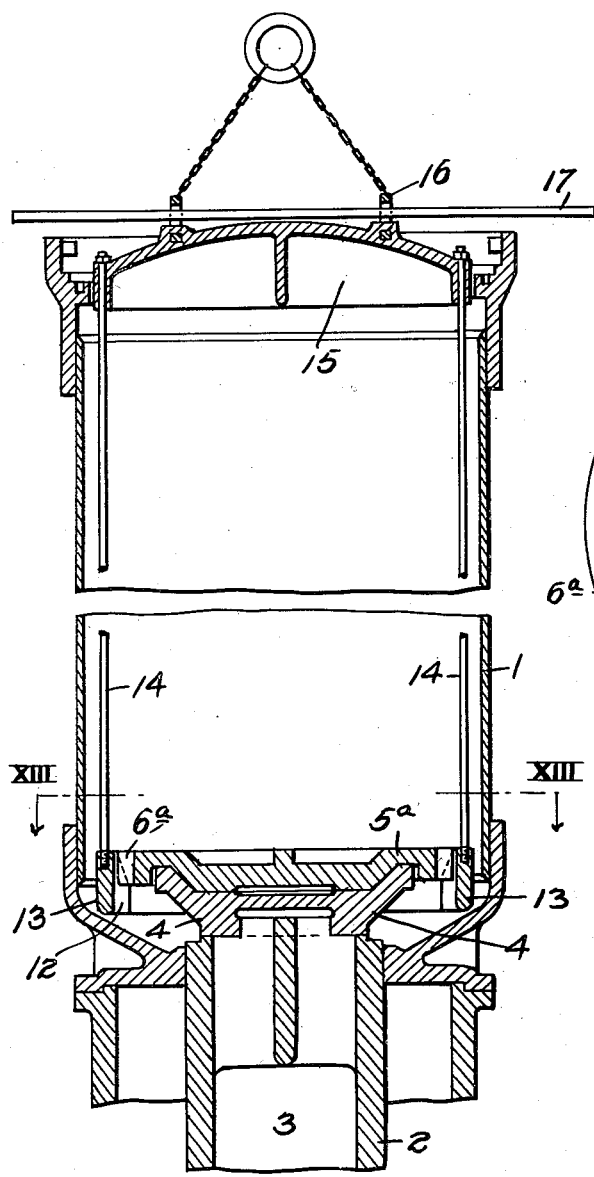
Figure 13:
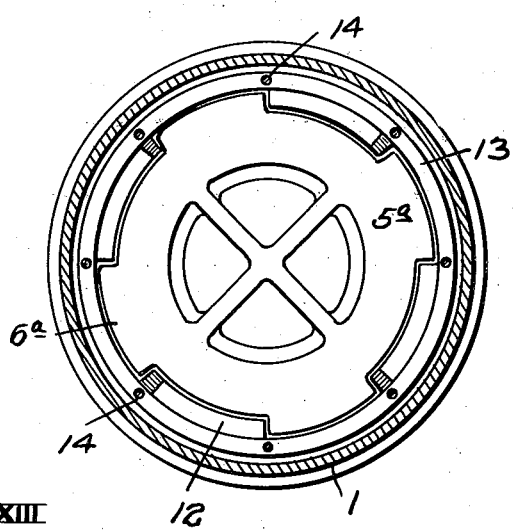
Figure 17:
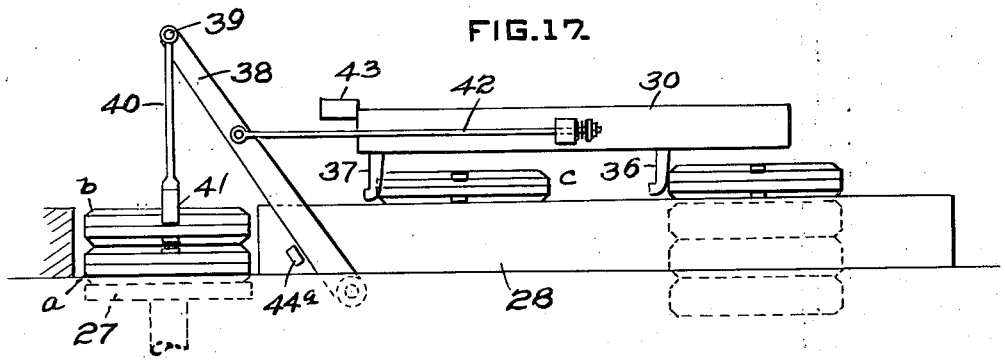
Figure 18:
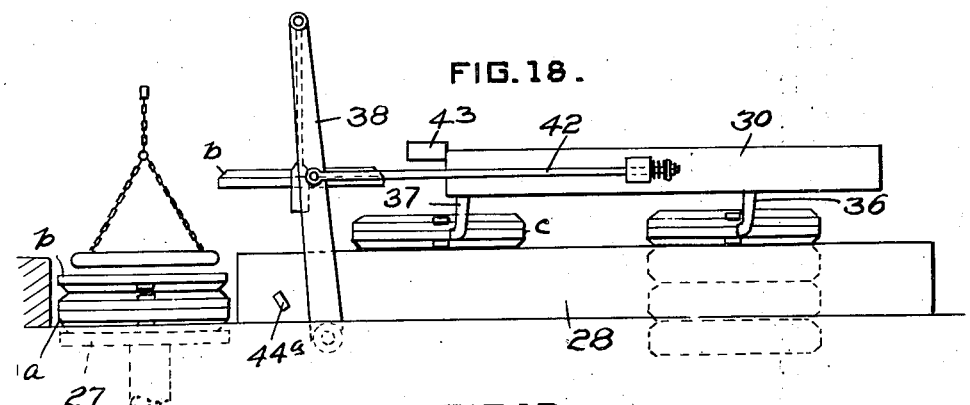
Figure 19:
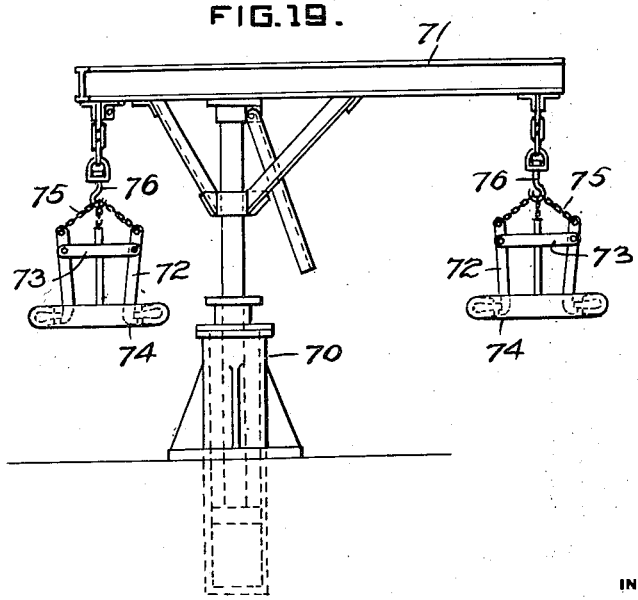

In the accompanying drawings forming a part of this specification, Fig. 1 is a plan view illustrating a room having a plurality of heating chambers, or receptacles, and mold-shifting and opening mechanism arranged in suitable or convenient proximity to the treating chambers; Fig. 2 is an elevation showing the transferring cranes, a heater and the mold-shifting and opening mechanism; Fig. 3 is a sectional view showing the mold-shifting mechanism in detail, the plane of section being indicated by the line III—III, Fig. 1; Fig. 4 is an end elevation of the mold shifting mechanism; Fig. 5 is a top plan view of the same; Fig. 6 is an elevation on an enlarged scale of a mechanism for loosening the mold sections from the vulcanized tire; Fig. 7 is a sectional elevation of the same; Fig. 8 is a sectional view on a large scale of a treating chamber showing the mechanism for placing and removing the molds within the chamber; Fig. 9 is a transverse section on a plane indicated by the line IX—IX, Fig. 8; Fig. 10 is a detail view of the lower end of the lifting rod, and Fig. 11 is a detail view showing the lugs on the supporting spider; Fig. 12 is a view similar to Fig. 8 illustrating a modification of the mold charging and removing mechanism; Fig. 13 is a sectional view on the plane indicated by the line XIII—XIII Fig. 9; Figs. 14 and to 18 inclusive illustrate the different stages of the operation of opening the mold, removing a completed article, recharging a new article and closing the molds; and Fig. 19 illustrates in elevation a form of mechanism for transferring green tires to the molds and removing the completed tire therefrom.

In the practice of the invention a plurality of heating chambers or tanks which may be of any known or suitable construction, are arranged preferably in a row along the one side of a room. These chambers or tanks are provided as usual with means for raising the molds against the cover of the tank or chamber, such means consisting of a fluid pressure cylinder 2, the ram 3, the top of which is adapted to bear against the underside of a lifting head 4 on which is supported a spider 5 carrying a stack or charge of molds. In order that all the molds may be removed at one time from this heating chamber, the spider 5 is provided with a central opening in the walls of which are formed spacing lugs 6 which are adapted to be engaged by radially projecting wings or fingers 7 on the lifting rod 8 as shown in Figs. 8 to 11. When the charge has been completed, this rod is passed down through the stack of molds, rotated sufficiently to bring the wings 7 under the lugs 6 on the spider so that when the rod is raised by the drum carried on the trolley 9, which is adapted to be shifted back and forth along the travelling crane 10, the entire charge is raised at one time from the treating chamber. In order to prevent the stack of molds resting on the spider from tipping, a steadying head 11 is adjustably mounted on the lifting rod 8 and in operation is so adjusted on the rod that it will pass down into the stack of molds.

In lieu of the construction shown in Figs. 8 to 11 inclusive, the form of charging and lifting device shown in Figs. 12 and 13 may be employed. In this construction the spider $5^a$ is provided with external lugs $6^a$ which are adapted to be engaged by projections 12 on the ring 13 which is connected by any suitable means, as rods 14 to a lifting head 15, which may be connected to the trolley 9 as hereinbefore described. This lifting head is provided with lugs 16 adapted to be engaged by a bar 17 whereby the lifting frame may be rotated to cause an engagement of the projections on the ring 13 with the lugs on the spider $5^a$ or a disengagement of such parts when the heating chamber or tank is being charged with molds.

When the treatment of the charge in one of the tanks or chambers has been completed, the cover is removed and the spider at the lower end of the stack of molds in the tank is connected to the trolley 9 by one or the other of the lifting devices hereinbefore described, and the stack of molds having completed articles therein is transferred by the trolley and crane to the vertically movable head 18 which is adapted to be raised or lowered by any suitable means. In the construction shown in Fig. 3 the head 18 is supported by a shaft 19 provided with a rack bar 20 adapted to intermesh with a pinion 21 on the shaft 22 which can be rotated by any suitable motor indicated at 23. On the opposite end of this shaft is secured a pinion 24 intermeshing with the rack bar 25 on a vertically movable shaft 26 on the upper end of which is secured a supporting head 27. As shown in Figs. 3, 5, and 14 to 18 inclusive, these heads 18 and 27 are arranged at opposite ends of a platform or table 28 across which the molds are shifted from one head to the other, as hereinafter described. The movement of the molds from one head to the other is interrupted to permit the mold sections being loosened from the article by any suitable means, such for example as that shown in Figs. 6 and 7.

As hereinbefore stated, a spider carrying a stack of molds containing fully treated tires is placed on the head 18 and the latter lowered until the upper mold is on a level with the upper surface of a platform 28. In order to shift the molds with the completed articles across the platform to opening position and then to the other head 27 where the upper section is lifted, a completed article removed, and a new one placed in position, any suitable means may be employed, such for example as that shown which consists of a substantially rectangular frame having side bars 30 through which pass shafts having the wheels 31 mounted thereon, said wheels adapted to move along rails 32 arranged parallel with and on opposite sides of the platform 28. Alongside of the lines of rails 32 are arranged rack bars 33 adapted to be engaged by a pinion 34 on a shaft carried by the frame and operated by a motor 35, also mounted on the moving frame and connected to the pinion through suitable train of gearing. On this frame are mounted two pairs of pawls 36 and 37, one pair of pawls as 36 being adapted to move a mold from the stack carried by the head 18 to a point midway of the platform where the upper mold section is released from the article and the article itself released from the lower section of the mold by suitable means, and the other pair of pawls as 37 being adapted to shift the mold with the loosened section and article from the opening position to a position over the other head 27. The pawls 36 are so mounted and constructed that when carried to the right in Figs. 3 and 14 to 18 inclusive, the depending arms of these pawls will slide past lugs $d$ on the molds, but when the platform is moved to the left, these depending arms will engage the lugs and slide the molds along the platform. The pawls 37 are similarly mounted so as to pass to the right beyond the lugs on the mold sections and to shift the mold from opening position onto the head 27 when the table is moved to the left. In order to lift the upper mold section from the mold when the latter is resting on the head 27, a pair of arms 38 are so pivotally mounted on opposite sides of the line of movement of the molds that they will always tend to fall to the left unless prevented by stops on the frame as hereinafter described. The upper ends of these arms are connected by a shaft 39 from which is suspended two bars 40 provided at their lower ends with hooks 41 adapted to engage the lugs on the upper sections of the molds and to lift the said sections from the lower sections when the arms 38 are drawn to the right by the movement of the frame as hereinafter described and as shown in Figs. 14 to 18.

In describing the operation of this mechanism, it will be supposed that as shown in Fig. 14, one mold $a$ has been moved across the platform onto the head 27 and the upper section of such mold has been lifted and is supported by the bars 40. The shifting slide or frame is in position at the right with the pawls 36 in the rear of the lugs on the upper mold $c$ of the stack supported by the head 18 and the pawls 37 in the rear or at the right of the mold $b$, the upper section of which has been loosened and the article itself loosened from the lower section. As the slide or frame moves to the left the mold $b$ will be moved along and into position on top of the mold residing on the head 27 and at the same time the mold $c$ will be moved along the platform to opening position. As the frame moves to the left to effect these movements of the molds, the arms 38 will swing to the left, the connecting bar 42 between such arms 38 and the frame permitting this movement of the bars. By this movement of the arms 38 the upper section of mold $a$ carried thereby will be first dropped or placed in position on its lower mold section resting on the head 27 in which a tire to be treated has been placed, and the hooks on the ends of the arms 40 will move down away from the lugs $d$ on such upper section. As clearly shown in Figs. 14 to 18, the arms 38 are so mounted as to swing forward and downward when the frame or slide is moved to the left, and as the bars 40 are pivotally mounted on the arms, the cover section of the mold $a$ will also swing to the left and down so as to deposit the cover or upper mold section on the lower section $a$ resting on the head 27. After the cover or upper section has been placed on the lower section of mold $a$, the movement of the arms 38 is arrested by stops $44^a$. The continued movement of the frame will slide the mold $b$ on top of the completed mold on the head 27 as shown in Fig. 15 and at the same time spreading blocks 43 on the frame will pass in between the depending bars 40 and force them outward, so that when the head 27 is lowered the lugs on the mold $a$ can move down without engagement with the hooks 41. The head 27 is now lowered a distance equal to the depth of a mold as shown in Fig. 16 and the frame is moved to the right. During this movement the spreading block 43 will first be withdrawn from between the bars 40 permitting the hooks 41 to swing in below the lugs on the upper section of the mold $b$ now forming part of the stack carried by the head 27. By the further movement of the frame the arms 38 are drawn to the right by the rods 42 and the hooks 41 being below and in alinement with the lugs on the upper section of mold $b$, the latter will be lifted and carried by the arms until the next movement of the frame to the right. This movement of the frame back and forth is continuous, the head 18 being raised a distance equal to the thickness of one mold after each mold has been shifted onto the platform and the head 27 moved progressively down as each mold is placed, charged and the top section fitted thereon. It will be readily understood that by making the wedge blocks 43 sufficiently wide, the bars 40 can be moved outwardly a sufficient distance to permit of the passage between them of molds of large diameter as well as smaller molds, and as the wedge blocks are withdrawn after the head 27 is lowered, the bars 40 will swing in so that hooks 41 on the bars 40 will engage the lugs on the mold last placed in position, whether such is large or small.

While the invention described and claimed herein is not limited as regards the broad claims to any particular construction of mechanism for loosening the mold sections from the vulcanized tires, the construction shown in Figs. 6 and 7 is well adapted to that purpose. This mechanism consists of a frame 44 having its lower end pivotally connected to an arm 45 in the shaft 46 on which is also secured a counter weight 47. While any suitable means may be employed for turning the shaft to raise or lower the frame 44, it is preferred to employ a motor driven worm 48 intermeshing with teeth on the periphery of the sector-shaped counter weight as such construction is not only efficient for shifting the frame but also for locking it in position. Any suitable means may be employed for shifting the frame laterally and holding it in such position, such for example as that shown in Fig. 6. The frame is connected by a link 49 to an arm 50 on the shaft 51 to which is also secured an operating lever 52. The frame 44 is provided at its upper end with a guiding head 53, through which pass bars 54 and 55, said bars being associated with a third bar 56 which is movable only with the frame. In the construction shown the lower ends of the movable bars 54 and 55 are connected to pitmen 57 which are provided with yokes 58 surrounding eccentrics 59 on the shaft 60 mounted in suitable bearings as the frame 44 and rotated by a motor 61 also mounted on the frame 44 or by any other suitable means. The movable bar 54 is provided at or adjacent to its upper end and on opposite sides with notches 62 for the reception of the inner periphery 63 of the annular core carrying the tire. The other movable bar 55 has toes 64 on opposite sides and adapted to pass under lugs 65 on the upper flush section, while the stationary bar has toes 66 adapted to project above the lugs 67 on the lower mold section when the mechanism is adapted for operation as hereinafter described.

As hereinbefore described, the molds containing the vulcanized tires are arrested in their movements over the platform 28 to permit of the loosening of the mold sections from the tire. At the point where the movements of the molds are arrested, the platform is provided with an opening and the mold loosening mechanism above described is arranged below the platform and in alinement with the opening therethrough, as shown in Figs. 3, 5, 6 and 7. As soon as a mold is moved into position over the opening in the platform, the worm 48 is rotated to raise the frame 44 to such a height that by shifting the frame laterally by means of the lever 52, the notch 62 will engage the periphery of the core, the toe 64 will pass under a lug on the upper mold section and the toe 66 project in over the lug on the lower mold section. The shaft 60 carrying the eccentrics 59 is next rotated to move the bars 54 and 55 upward thereby lifting the upper mold section and also the vulcanized tire from the lower mold section. It is immaterial whether the tire is separated from the lower mold section first and the upper mold section then loosened from the tire or vice versa, but in either case the throw of the eccentric connected to the bar employed for shifting the upper mold section should be greater than that of the eccentric operating the bar which engages and shifts the tire relative to the lower mold section, which is held stationary relative to the core by the bar 56 while the core is being shifted.

In order to prevent injury to the tire, when loosening it from the mold sections, the loosening can begin at one point and extend therefrom. This procedure is carried out in the described mechanism as after the separation has been effected at one side the bars 54 and 55 are lowered and the frame shifted by the lever 52 so that the several bars will engage the core and mold sections at another point, as for example, diametrically opposite the place where separation was first effected.

As hereinbefore stated, the removal of a finished tire and its core from the lower section of the mold and the placing of a green tire and the core on which it has been built up, is effected while such mold section is in position above the vertically movable head 27. As these tires and their cores are in some cases so large and heavy as to render their being shifted from and to the mold sections by hand difficult, provision is made for removing the completed tires from and supplying green tires to the mold section by power operated devices. As shown in Figs. 1 and 19 a crane 70 having radial arms 71 is arranged in suitable proximity to the mold stacking end of the platform 28. To these arms are connected means for engaging the inwardly projecting rims of the cores. A convenient construction consisting of a plurality of levers 72 pivotally mounted on the arm of the spider 73 and provided at their lower ends with toes 74. The upper ends of the levers are connected by chains 75 to a hook 76 depending from the radial arms of the crane, so that when the arms are raised, which in the construction shown in Fig. 19 is effected by a vertical movement of the mast of the crane, the lower ends of the levers will be moved out, thereby causing the toes 74 to engage the rim of the cores.

I claim herein as my invention:

1. In a plant for treating rubber tires the combination of two vertically movable heads adapted to support a plurality of molds, means for shifting the molds in succession from one head to the other and means intermediate the heads for loosening the mold sections from the completed tire.

2. In a plant for treating rubber tires, the combination of two vertically movable heads adapted to support a plurality of molds, means for shifting the molds in succession from one head piling them in succession on the other head, means intermediate the heads for loosening the mold sections from the completed tires, and means for shifting the upper section to permit of the removal of a completed tire and the placing of a green tire in the lower mold section.

3. In a plant for treating rubber tires, the combination of means for removing a stack of molds from a vulcanizing chamber, mechanism for shifting a mold from one point to another, means for presenting a stack of molds one at a time to the transfer mechanism, means whereby the molds are delivered one at a time by the transfer mechanism upon a mold previously shifted, thereby forming a stack of superposed molds, and means for transferring the stack so formed to a vulcanizing chamber.

4. In a plant for treating rubber tires, the combination of means for removing a stack of molds from a vulcanizing chamber, mechanism for shifting a mold from one point to another, means for presenting a stack of molds one at a time to the transfer mechanism upon a mold previously shifted, thereby forming a stack of superposed molds, means for shifting the upper section to permit the substitution of a green tire for the vulcanized tire and means for transferring the stack so formed to a vulcanizing chamber.

5. In a plant for treating rubber tires, the combination of means for removing a stack of molds from a vulcanizing chamber, a mold transfer mechanism, means for presenting a stack of molds one at a time to the transfer mechanism, means for loosening the sections of the mold, from the completed tire, means whereby the molds are delivered by the transfer mechanism upon a previously transferred mold, means for shifting the upper section of the mold when in stack formation to permit the substitution of a green tire for a vulcanized tire.

6. In a plant for treating rubber tires the combination of a vertically movable head, means for shifting molds in succession on said head, and means operative by the shifting means for removing the upper section of the molds, whereby completed articles may be removed and articles to be treated may be placed in the lower section.

7. In a plant for treating rubber tires, the combination of a vertically movable head, means for transferring molds in succession to such head, means for engaging the upper section of the mold, and means for shifting such engaging means vertically and laterally to permit access to the lower mold section.

8. In a plan for treating rubber tires, the combination of a vertically movable head, means for moving the molds in succession on such head, means for engaging the upper mold section, and operative by the transferring means to move such section vertically and laterally.

In testimony whereof, I have hereunto set my hand.

AUGUST P. DIESCHER.